United States Patent
Rehm

[11] Patent Number: 5,940,948
[45] Date of Patent: Aug. 24, 1999

[54] MACHINING CENTER

[75] Inventor: Karl Rehm, Mindelheim, Germany

[73] Assignee: Grob-Werke GmbH & Co. KG, Mindelheim, Germany

[21] Appl. No.: 08/899,474

[22] Filed: Jul. 24, 1997

[30] Foreign Application Priority Data

Jul. 26, 1996 [DE] Germany ............................ 196 30 091
Dec. 27, 1996 [DE] Germany ............................ 196 54 536

[51] Int. Cl.$^6$ ................................................ B23Q 7/00
[52] U.S. Cl. ................................... 29/33 P; 29/DIG. 59; 29/563; 144/2.1; 198/345.3; 198/346.1; 414/744.6; 409/137; 409/163
[58] Field of Search ...................... 29/33 P, 335, 29/563, 564, 568, DIG. 56, DIG. 59; 144/1.1, 3.1, 48.1, 134.1, 2.1; 414/744.3, 744.6, 749, 750, 783; 409/134, 137, 168, 221, 224, 235, 163, 164; 198/345.3, 346.1

[56] References Cited

U.S. PATENT DOCUMENTS

| | | | |
|---|---|---|---|
| 3,986,617 | 10/1976 | Blomquist | 414/744.3 |
| 4,173,817 | 11/1979 | Voglrieder et al. | 29/568 |
| 4,777,715 | 10/1988 | Roberts | 29/568 |
| 4,797,990 | 1/1986 | Yamaguchi et al. | 29/568 |
| 4,951,376 | 8/1990 | Grund | 29/568 |
| 5,117,552 | 6/1992 | Babel | 29/568 X |
| 5,172,464 | 12/1992 | Kitamura et al. | 29/563 |
| 5,564,483 | 10/1996 | Sacchi | 29/33 P X |

FOREIGN PATENT DOCUMENTS

| | | |
|---|---|---|
| 0484556 | 5/1992 | European Pat. Off. |
| 4027895 | 3/1992 | Germany . |
| 4422416 | 1/1996 | Germany . |

OTHER PUBLICATIONS

Derwent Publications Ltd., Database WPI, Section PO, Week 8238, Nov. 3, 1982 and SU880689A (Ivan Reaming Tools), Nov. 15, 1981.
Derwent Publications, Ltd., Database WPI, Section PO, Week 8605, Feb. 15, 1986, and SU1166965A (Odess Spec Tools), Jul. 15, 1985.
S.E. Gurychev et al, "Metal cutting machine tools . . . ", Soviet Engineering Research, Mar. 2, 1983, pp. 65–68, New York.

*Primary Examiner*—W. Donald Bray
*Attorney, Agent, or Firm*—Jacobson, Price, Holman & Stern, PLLC

[57] ABSTRACT

In a centre for machining workpieces, of the type comprising a machine frame, a machining table (6) for workpieces held on pallets (7) and a device (9) for pallet changing, it is proposed that the table (6) be arranged above the pallets (7), and the workpieces or a device (8) carrying the workpiece or workpieces project(s) downwards from the pallet during machining.

9 Claims, 4 Drawing Sheets

MACHINING CENTER

BACKGROUND TO THE INVENTION

The invention relates to a centre for machining workpieces, comprising a machine frame, a machining table for workpieces held by pallets and a device for pallet changing.

In machining centres, the workpieces are generally machined while arranged in an upright position on the pallets. The shavings produced during machining are washed away by oil or other liquid media. However, the pallets and the associated apparatus generally interfere with transport of the shavings. It is moreover undesirable for the shavings to become wet.

BRIEF SUMMARY OF THE INVENTION

The aim of the invention is to provide an arrangement allowing for improved removal of shavings.

It is proposed according to the invention that the table is arranged above the pallets and the workpieces, or a device carrying the workpiece or workpieces, project(s) downwards from the pallet during machining.

In the arrangement according to the invention, the shavings fall downwards during machining, and therefore move away from the workpiece and also the means for holding and clamping the workpieces or the devices carrying the workpieces. Discharge means for the shavings, for example having a funnel shape, can therefore be arranged below the workpieces and a conveyor can then be provided in the funnel itself.

In the invention, the preparation point is advantageously arranged in a similar manner to the table on which the pallets are held during machining. This results in very simple movements during pallet changing and also ensures that high machining accuracy is achieved. An arrangement of this kind can be achieved, for example, by providing the machine frame with a stand carrying an upper frame part. The table as well as a preparation point and the changer are held on the frame part.

A turning apparatus or pallet changer then brings the pallets from the preparation point to the table, where they are clamped in position. It may be advantageous in some cases to provide struts in order to stabilize sufficiently those parts of the machine frame extending over the preparation point and the table.

DESCRIPTION OF PREFERRED EMBODIMENTS

Figure 1:
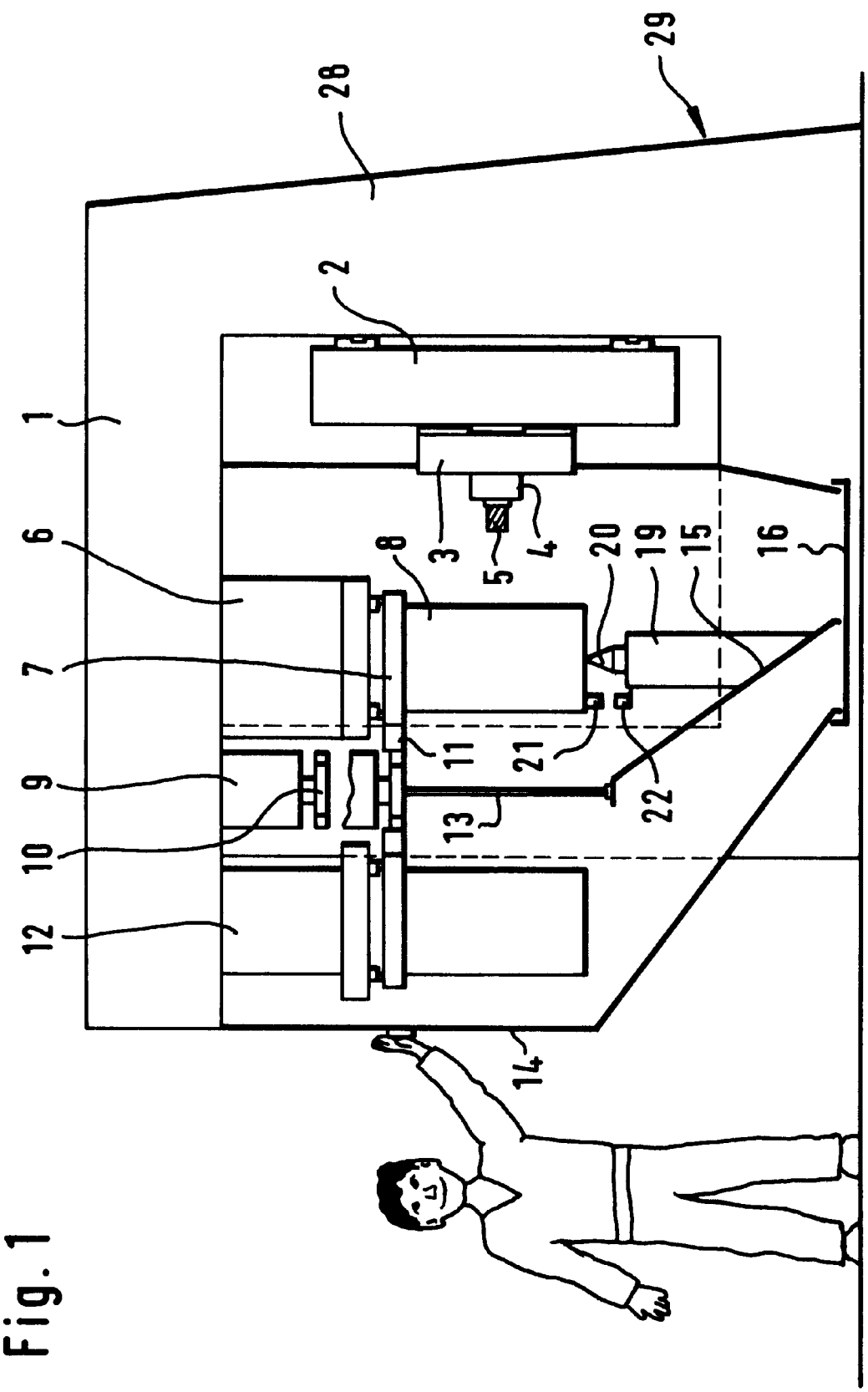
FIG. 1 is a schematic side view of a machine according to the invention.

The machine, as shown by way of example in FIG. 1, comprises essentially a frame, an upper frame part 1 of which extends over a machining area and also a preparation point 12. A pallet changer 9 is arranged between the machining area, i.e. a table 6, and the preparation point 12, the gripper 10 of which can grip the pallets 7 by means of the coupling elements 11, so that a pallet at the preparation point and a pallet 7 on the machining table can be pivoted about a pivot axis 13, whereby the respective devices 8 mounted on the pallets can change their positions. During pallet changing, the pallets are removed, for example downwards, after the loosening of connecting elements, so that they are released from their respective mountings and coupling elements. Rotation about the axis 13 is followed by renewed raising and coupling.

The coupling elements 11 may adapt to the shape of the pallets which they grip.

A centring device 20 cooperates with the device 8 in the machining position. The couplings between the supporting means 19, which also carries the centring device 20, are designated by the reference numerals 21 and 22. The elements 20, 21 and 22 can be dispensed with or can be replaced by other suitable means.

Figure 2:
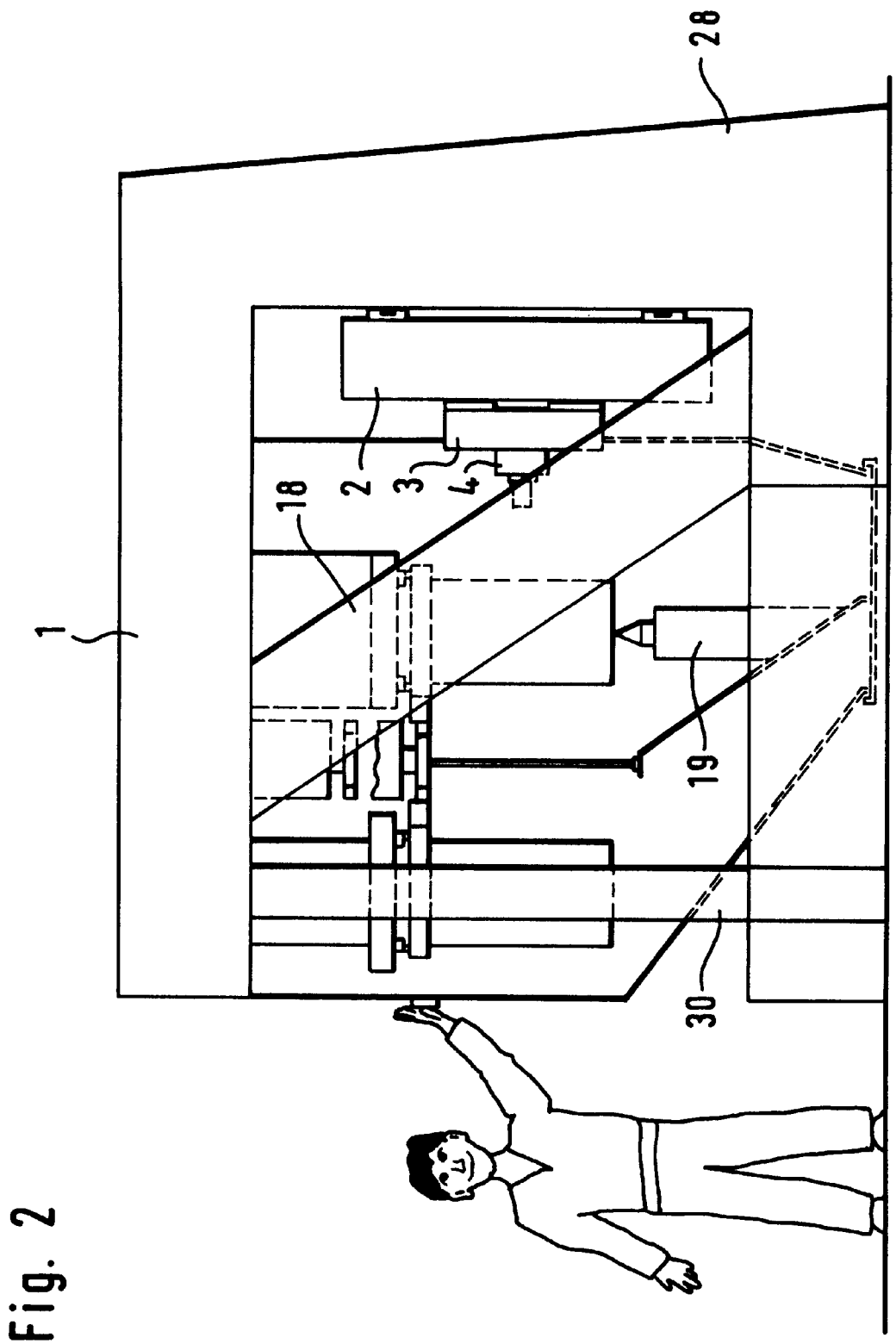
FIG. 2 shows a modified embodiment of a machine according to the invention.
Figure 3:
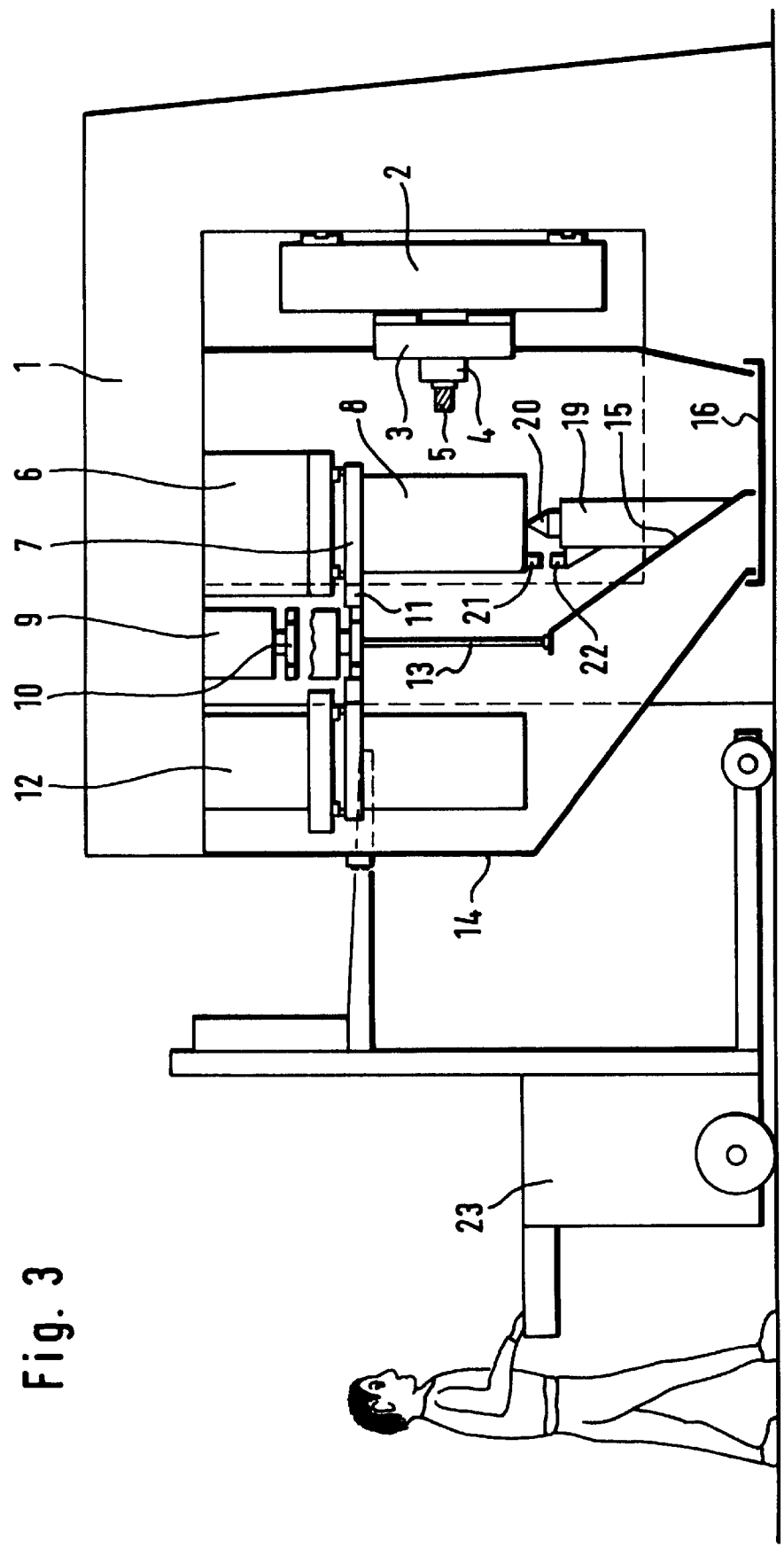
FIG. 3 shows the machine of FIG. 1, but with ancillary equipment.

As will be clear in particular from FIG. 1, the machine part 1 is supported at its projecting end. An additional strut 18 can also be used, supplementing the strut at the projecting end, as can be seen from FIG. 2. In FIG. 2, the additional strut 18 forms a rigid triangle with the upper frame part 1 and a stand 28 which carries the upper frame part 1. A further strut 30 is also shown, the pallet 7 being located between the additional strut 18 and the further strut 30 when in the machining position.

The tool for machining the workpieces on the device 8 is designated by the reference numeral 5. This tool is held on the slide 3, which is displaceable in the vertical direction, the slide 2 allowing for displacement along the X-axis. The sleeve 4 carrying the tool provides for movement along the Z-axis.

The reference numeral 15 designates a plate serving to guide shavings into a trough 16 from where they can then be conveyed away through a discharge device 31. The wall 14 closes the preparation point during changing.

The invention can be put into effect by mounting the individual workpieces, e.g. on the devices 8. However, the pallet at the tooling point can also be moved together with the associated apparatus and if necessary also the workpieces by an ancillary device, e.g. a truck 23. This is then important, e.g. if other devices or workpieces are used. A truck of this kind may be designed as a fork-lift truck. The construction of the machine means that it is possible to pass under the preparation point so that the appropriate mechanical means can be inserted, for example when changing the apparatus 8.

Figure 4:
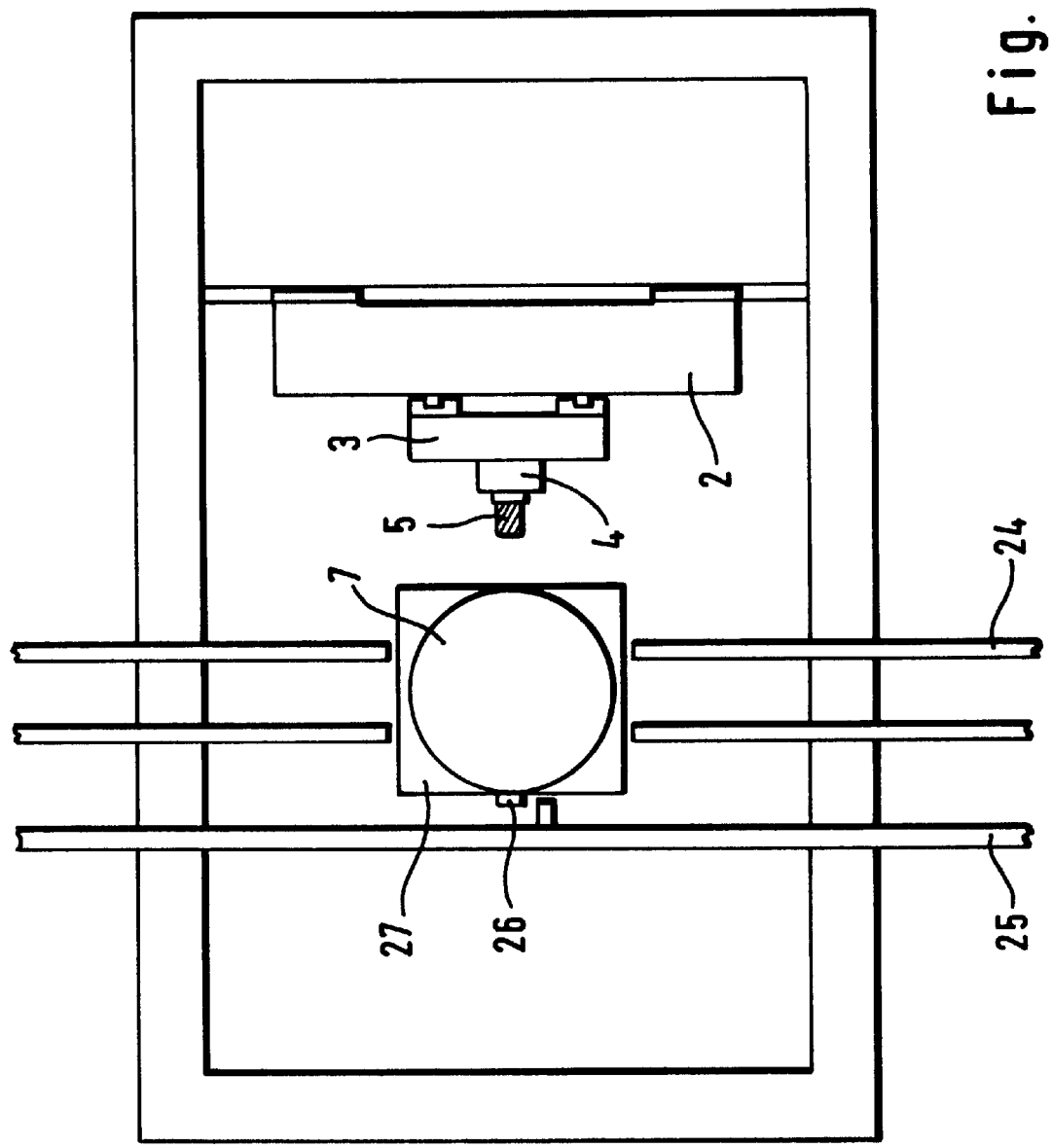
FIG. 4 is a sectional underside view of another embodiment of the invention.

Although the invention preferably serves to bring the workpieces from a preparation point into the machining position, the same considerations can still be applied when a machine is arranged in a transfer line, as indicated by FIG. 4. It is assumed that a pallet with associated apparatus is brought on a guide 24 into the machining position, where the pallet is positioned in the conventional manner. After machining, the pallet with the workpieces or apparatus, is advanced in the same direction to the next machining station. A transfer rod 25 cooperating with a carrier 26 provides for transport.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An apparatus for machining workpieces, said apparatus comprising
   (a) a machine frame,
   (b) a machining table for a workpiece held by a pallet,
   (c) a device for pallet changing,
   the machining table being arranged above the pallet and above the workpiece with the workpiece projecting downwardly from the pallet during machining, and
   a discharge device located below the machining table and below the workpiece for collecting shavings falling downwardly from the workpiece during machining of the workpiece.

2. The apparatus according to claim 1, wherein the machine frame has a stand carrying an upper frame part on which the machining table, a preparation area and the device for pallet changing are held.

3. The apparatus according to claim 1, wherein the device for pallet changing has drivable coupling elements which grip and adapt to the shape of the pallets.

4. The apparatus according to claim 1, further comprising a supporting means with a centering device for providing support from below for the workpiece held by the pallet.

5. The apparatus according to claim 1, wherein an upper part of the machine frame is supported by means of struts.

6. The apparatus according to claim 5, wherein a strut forms a rigid triangle together with the upper part of the machine frame and a stand which carries said upper part.

7. The apparatus according to claim 5, wherein two struts are provided, between which the pallet is situated when in the machining position.

8. The apparatus according to claim 1, wherein a truck is used to convey the pallet to and away from a preparation point.

9. The apparatus according to claim 1, which is arranged in a transfer line, and wherein a suspended apparatus carriage is provided for the pallet, the carriage being movable on guides.

* * * * *